(12) United States Patent
Qiu et al.

(10) Patent No.: US 9,391,882 B2
(45) Date of Patent: *Jul. 12, 2016

(54) METHOD, SYSTEM, AND DEVICE FOR ESTABLISHING PSEUDO WIRE

(71) Applicant: Huawei Technologies Co., Ltd., Shenzhen (CN)

(72) Inventors: Chaowa Qiu, Beijing (CN); Li Xue, Shenzhen (CN); Changbao Liu, Beijing (CN); Wei Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/640,841

(22) Filed: Mar. 6, 2015

(65) Prior Publication Data

US 2015/0188809 A1 Jul. 2, 2015

Related U.S. Application Data

(63) Continuation of application No. 13/548,880, filed on Jul. 13, 2012, which is a continuation of application No. PCT/CN2011/070308, filed on Jan. 17, 2011.

(30) Foreign Application Priority Data

Jan. 15, 2010 (CN) .......................... 2010 1 0001249

(51) Int. Cl.
*H04L 12/723* (2013.01)
*H04L 12/707* (2013.01)
(Continued)

(52) U.S. Cl.
CPC ............... *H04L 45/50* (2013.01); *H04L 45/22* (2013.01); *H04L 45/28* (2013.01); *H04L 45/68* (2013.01); *H04L 45/745* (2013.01)

(58) Field of Classification Search
CPC ......... H04L 45/68; H04L 47/10; H04L 45/50; H04L 45/22; H04L 45/28; H04L 45/745
See application file for complete search history.

(56) References Cited

U.S. PATENT DOCUMENTS

| 7,408,941 | B2 | 8/2008 | Martini et al. |
| 8,130,775 | B2 * | 3/2012 | Jounay ................... H04L 45/10 370/401 |

(Continued)

FOREIGN PATENT DOCUMENTS

| CN | 1625176 A | 6/2005 |
| CN | 1874302 A | 12/2006 |

(Continued)

OTHER PUBLICATIONS

Jounay et al., "LDP Extensions for Leaf-Initiated Point-to-Multipoint Pseudowire" Network Working Group, Nov. 3, 2008.

(Continued)

*Primary Examiner* — Ajay Cattungal
(74) *Attorney, Agent, or Firm* — Brinks Gilson & Lione

(57) ABSTRACT

A method, a system, and a device for establishing a pseudo wire are disclosed. The method includes: receiving, by a switching provider edge at a bifurcation position, a label mapping message, obtaining information of the switching provider edge at the bifurcation position and information of at least two next hops or outgoing interfaces of the switching provider edge through parsing, comparing the information of the switching provider edge at the bifurcation position with information of a local device, and if the information of the switching provider edge at the bifurcation position matches with the information of the local device, establishing at least two pseudo wires from the switching provider edge according to the information of at least two next hops or outgoing interfaces.

9 Claims, 6 Drawing Sheets

(51) Int. Cl.
*H04L 12/703* (2013.01)
*H04L 12/721* (2013.01)
*H04L 12/741* (2013.01)

(56) References Cited

U.S. PATENT DOCUMENTS

| | | | | |
|---|---|---|---|---|
| 8,804,749 | B2* | 8/2014 | Jounay | H04L 45/00 370/235 |
| 2005/0129059 | A1 | 6/2005 | Jiang et al. | |
| 2006/0190570 | A1* | 8/2006 | Booth, III | H04L 12/4641 709/220 |
| 2007/0242603 | A1* | 10/2007 | Ghosh | H04L 43/026 370/216 |
| 2008/0095061 | A1* | 4/2008 | Hua | H04L 43/0811 370/248 |
| 2008/0175234 | A1* | 7/2008 | Li | H04L 45/10 370/389 |
| 2008/0229059 | A1* | 9/2008 | May | G06F 15/16 712/16 |
| 2008/0240121 | A1 | 10/2008 | Xiong et al. | |
| 2008/0259931 | A1* | 10/2008 | Papadimitriou | H04L 12/5695 370/395.3 |
| 2008/0279110 | A1* | 11/2008 | Hart | H04L 12/2697 370/248 |
| 2009/0201831 | A1 | 8/2009 | Kumar et al. | |
| 2010/0098094 | A1* | 4/2010 | Jounay | H04L 45/22 370/401 |

FOREIGN PATENT DOCUMENTS

| | | |
|---|---|---|
| CN | 1983960 A | 6/2007 |
| CN | 101035019 A | 9/2007 |
| CN | 101159573 A | 4/2008 |
| CN | 101505227 A | 8/2009 |
| CN | 101552711 A | 10/2009 |
| JP | 2007/028386 A | 2/2007 |
| JP | 2008/211704 A | 9/2011 |
| WO | WO 2008/110735 A2 | 9/2008 |

OTHER PUBLICATIONS

Martini et al., "Pseudowire Setup and Maintenance Using the Label Distribution Protocol (LDP)" Network Working Group, Apr. 2006.
Muley et al., "Preferential Forwarding Status bit Definition" Network Working Group, Oct. 24, 2009.

* cited by examiner

METHOD, SYSTEM, AND DEVICE FOR ESTABLISHING PSEUDO WIRE

CROSS-REFERENCE TO RELATED APPLICATIONS

This application is a continuation of U.S. application Ser. No. 13/548,880, which is a continuation of International Application No. PCT/CN2011/070308, filed on Jan. 17, 2011, which claims priority to Chinese Patent Application No. 201010001249.6, filed on Jan. 15, 2010, all of which are hereby incorporated by reference in their entireties.

FIELD OF THE INVENTION

The present invention relates to the field of communications technologies, and in particular, to a method, a system, and a device for establishing a pseudo wire.

BACKGROUND OF THE INVENTION

In actual networking application, a network constructed by using a large number of single-segment pseudo wires (Single-Segment Pseudo-Wire, SS-PW) brings great pressure on a service convergence device. A multi-segment pseudo-wire (Multi-Segment Pseudo-Wire, MS-PW) technology is proposed in the field of pseudo-wire emulation edge to edge (Pseudo-Wire Emulation Edge to Edge, PWE3) technologies, where a switching provider edge (Switching PE, S-PE, hereinafter referred to as SPE) is mainly used to relieve pressure of a convergence device and solve cross-domain deployment and security problems of a network.

Referring to FIG. 1a, in a networking system constructed by using an MS-PW, when a local customer edge (CE1) communicates with a peer CE2, the communication needs to implement through a terminating provider edge (Terminating Provider Edge, TPE1) of a service provider, where the terminating provider edge is directly connected to the local CE1, and pseudo-wire connections to a TPE3 and a TPE4 respectively by passing through an SPE1 and an SPE2 are established. A pseudo wire between PEs (including a TPE and a SPE) is established through the following steps:

1: Establish session connections between the TPE1 and the SPE1, the SPE2 as well as the TPE3; and establish session connections between the TPE1 and the SPE1, the SPE2 as well as the TPE4.

2: Establish a PW route through a routing protocol.

3: The TPE1 sends a label mapping message (label mapping) to establish a multi-segment pseudo wire from the TPE1 to the TPE3; and the TPE1 sends a label mapping message to establish another multi-segment pseudo wire from the TPE1 to the TPE4, where one of the multi-segment pseudo wires may be set as an active pseudo wire during an establishment process.

4: After receiving the label mapping message, the TPE3 or the TPE4 finishes establishing a reverse pseudo wire to the TPE1.

After the preceding pseudo wires are established, when communication is established between two customer edges, and when a TPE finds that the active pseudo wire fails, an active/standby pseudo wire switchover is performed. In this way, the active/standby pseudo wire switchover can only be completed from a local TPE to a peer TPE, so that a pseudo wire protection switchover between customer edges lasts for a long time.

SUMMARY OF THE INVENTION

Embodiments of the present invention provide a method, a system, and a device for establishing a pseudo wire, to speed up a procedure of a pseudo wire protection switchover between customer edges and save a network resource.

An embodiment of the present invention provides a method for establishing a pseudo wire. A switching provider edge receives a label mapping message. The label mapping message includes information of a switching provider edge at a bifurcation position. The label mapping message further comprises information of at least two next hops or information of at least two outgoing interfaces of the switching provider edge at the bifurcation position. The switching provider edge parses the label mapping message to obtain the information of the switching provider edge at the bifurcation position and to obtain the information of the at least two next hops or the information of at least two outgoing interfaces. The switching provider edge compares information of the switching provider edge with the information of the switching provider edge at the bifurcation position. If the information of the switching provider edge matches with the information of the switching provider edge at the bifurcation position, the switching provider edge establishes at least two pseudo wires from the switching provider edge according to the information of the at least two next hops or the information of at least two outgoing interfaces.

An embodiment of the present invention provides a method for establishing a pseudo wire. A switching provider edge forms pseudo wire routing entry information. The pseudo wire routing entry information includes a correspondence between a first destination address and at least two next hop addresses, or information of at least two different pseudo wire routes to a device that is corresponding to the first destination address. When receiving pseudo wire establishing signaling, wherein the pseudo wire establishing signaling requests that a pseudo wire to the device that is corresponding to the first destination address be established, the switching provider edge establishes at least two pseudo wires from the switching provider edge according to the at least two next hop addresses or the information of at least two different routes to the device that is corresponding to the first destination address.

An embodiment of the present invention provides a switching provider edge, including a packet receiving unit, a parsing unit and a matching and establishing unit. The packet receiving unit is configured to receive a label mapping message. The label mapping message includes information of a switching provider edge at a bifurcation position. The label mapping message further includes information of at least two next hops or information of at least two outgoing interfaces of the switching provider edge at the bifurcation position. The parsing unit is configured to parse the label mapping message received by the packet receiving unit to obtain the information of the switching provider edge at the bifurcation position and to obtain the information of at least two next hops or the information of at least two outgoing interfaces. The matching and establishing unit is configured to compare the information of the switching provider edge at the bifurcation position with information of the switching provider edge. If the information of the switching provider edge at the bifurcation position matches with the information of the switching provider edge. The matching and establishing unit is further configured to establish at least two pseudo wires from the switching provider edge according to the information of at least two next hops or the information of at least two outgoing interfaces.

An embodiment of the present invention provides a terminating provider edge (TPE) of a service provider, including a packet generating unit and a packet sending unit. The packet generating unit is configured to generate a label mapping message. The label mapping message includes information of a switching provider edge at a bifurcation position. The label mapping message further includes information of at least two next hops or information of at least two outgoing interfaces of the switching provider edge at the bifurcation position. The packet sending unit is configured to send the label mapping message generated by the packet generating unit to a switching provider edge, so that a switching provider edge that matches with the information of the switching provider edge at the bifurcation position establishes at least two pseudo wires from the switching provider edge according to the information of two next hops or the information of at least two outgoing interfaces.

An embodiment of the present invention provides a switching provider edge, including a correspondence forming unit and a pseudo wire establishing unit. The correspondence forming unit is configured to form pseudo wire routing entry information. The pseudo wire routing entry information includes a correspondence between a first destination address and at least two next hop addresses, or information of at least two different routes to a device that is corresponding to the first destination address. The pseudo wire establishing unit is configured to, when pseudo wire establishing signaling is received, wherein the pseudo wire establishing signaling requests that a pseudo wire to the device that is corresponding to the first destination address be established, establish at least two pseudo wires from a local device according to the at least two next hop addresses that are corresponding to the first destination address, or the information of at least two different routes to the device that is corresponding to the first destination address.

An embodiment of the present invention provides a system for establishing a pseudo wire. The system includes a switching provider edge and a terminating provider edge (TPE) of a service provider. The terminating provider edge TPE of the service provider is configured to generate a label mapping message. The label mapping message includes information of a switching provider edge at a bifurcation position. The label mapping message further includes information of at least two next hops or information of at least two outgoing interfaces of the switching provider edge at the bifurcation position. The terminating provider edge TPE of the service provider is further configured to send the generated label mapping message to the switching provider edge. The switching provider edge is configured to receive the label mapping message, parse the label mapping message to obtain the information of the switching provider edge at the bifurcation position and to obtain the information of at least two next hops or the information of at least two outgoing interfaces of the switching provider edge at the bifurcation position; compare the information of the switching provider edge at the bifurcation position with information of the switching provider edge; and if the information of the switching provider edge at the bifurcation position matches with the information of the switching provider edge, establish at least two pseudo wires from the switching provider edge according to the information of at least two next hops or the information of at least two outgoing interfaces.

The method for establishing a pseudo wire in this embodiment is applicable to pseudo wire establishment in an MS-PW system. Compared with the prior art in which the TPE sends one label mapping message to establish one pseudo wire, with the method for establishing a pseudo wire in this embodiment, multiple pseudo wires from the switching provider edge at the bifurcation position to a destination node are established. In this way, a network resource can be saved and highly effective protection can be provided for an MS-PW.

In addition, the switching provider edge at the bifurcation position establishes two pseudo wires and completes establishment of MS-PW segments, and furthermore, an active/standby identification of the MS-PW segments may be implemented. When it is determined that an active pseudo wire segment is faulty, a fast protection switchover of an MS-PW may be implemented on the switching provider edge. In this way, a fast recovery procedure of a pseudo wire is speeded up, and segment protection of the MS-PW can be provided from the switching provider edge at the bifurcation position, thereby making better use of a network resource.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are merely some embodiments of the present invention, and persons of ordinary skill in the art may still obtain other drawings according to these accompanying drawings without creative efforts.

DETAILED DESCRIPTION OF THE EMBODIMENTS

The technical solutions in embodiments of the present invention are clearly and fully described in the following with reference to the accompanying drawings in the embodiments of the present invention. Apparently, the embodiments to be described are only a part rather than all of the embodiments of the present invention. Based on the embodiments of the present invention, all other embodiments obtained by persons of ordinary skill in the art without creative efforts shall fall within the protection scope of the present invention.

Method Embodiment 1

Figure 1A:
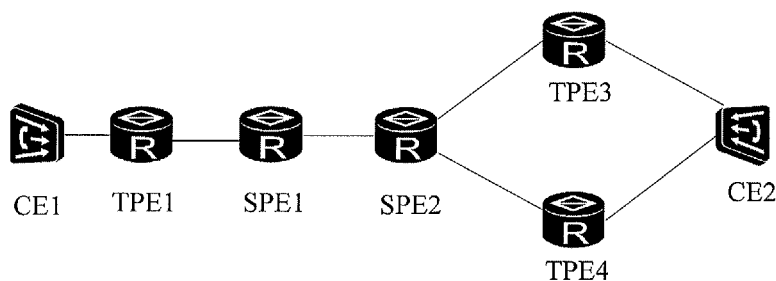
FIG. 1a is a schematic structural diagram of a networking system constructed by an MS-PW.
Figure 1B:
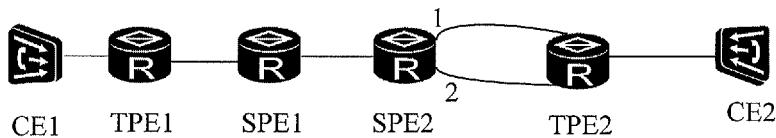
FIG. 1b is a schematic structural diagram of another networking system constructed by an MS-PW.
Figure 2:
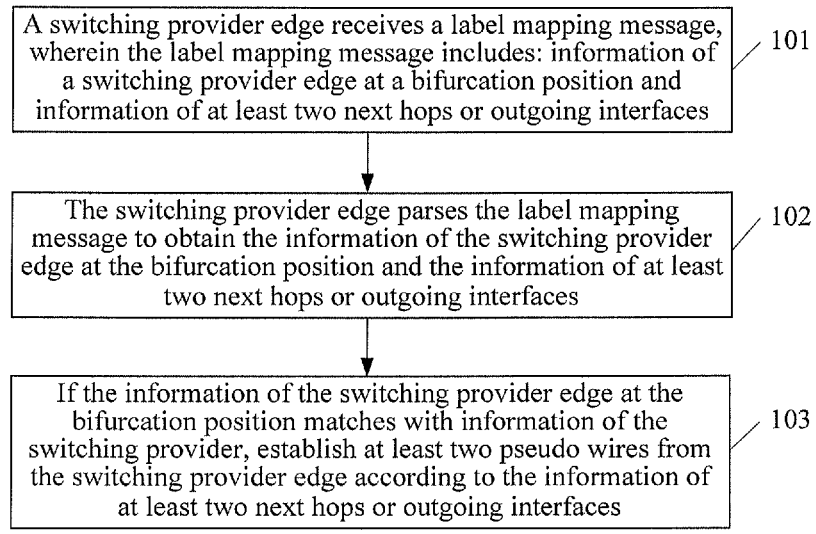
FIG. 2 is a flow chart of a method for establishing a pseudo wire according to a first method embodiment of the present invention.

A method for establishing a pseudo wire is provided, and the method in this embodiment is applicable to an MS-PW system as shown in FIG. 1a, where within an MS-PW between a CE1 and a CE2, an SPE2 is connected to two different TPEs respectively; and is also applicable to an MS-PW system as shown in FIG. 1b, where an SPE2 may reach a TPE2 through different outgoing interfaces. A flow chart of the method in this embodiment is shown in FIG. 2, where the method includes:

Step 101: A switching provider edge receives a label mapping message. The label mapping message includes information of a switching provider edge at a bifurcation position. The label mapping message further includes information of at least two next hops of the switching provider edge at the bifurcation position or information of at least two outgoing interfaces of the switching provider edge at the bifurcation position.

The switching provider edge at the bifurcation position here refers to a switching provider edge that implements redundancy protection of a pseudo wire. The switching provider edge may be connected to two different TPE devices. As shown in FIG. 1a, the switching provider edge at the bifurcation position is a SPE2 that is connected to a TPE3 and a TPE4 respectively. The switching provider edge may reach the same next-hop device through different outgoing interfaces. As shown in FIG. 1b, an SPE2 at the bifurcation position is connected to a next-hop device TPE2 through outgoing interfaces 1 and 2.

It may be understood that, the label mapping message may further include information related to an explicit path. The information related to the explicit path is used for releasing explicit routing information, for example, active/standby information indicating establishment of at least two pseudo wires, and so on.

Step 102: The switching provider edge parses the label mapping message to obtain the information of the switching provider edge at the bifurcation position and to obtain the information of at least two next hops or the information of at least two outgoing interfaces.

It may be understood that, when the label mapping message is parsed to obtain the information of the switching provider edge at the bifurcation position and to obtain the information of at least two next hops or the information of at least two outgoing interfaces. Explicit path information, for example, information in additional information (Sub-TLV) in type-length-value (TLV) in the label mapping message may be parsed. The information of the switching provider edge may be a device identifier, and so on. Information of a next hop may be information such as an Internet Protocol (IP) address of a device.

Step 103: The switching provider edge compares the information of the switching provider edge at the bifurcation position with information of the switching provider. If the information of the switching provider edge at the bifurcation position matches with the information of the switching provider, at least two pseudo wires are established from the switching provider edge according to the information of at least two next hops or the information of at least two outgoing interfaces. If the information of the switching provider edge at the bifurcation position does not match with the information of the switching provider, it indicates that the switching provider edge receiving the label mapping message is not at a bifurcation position, and the label mapping message is forwarded to a next-hop node device, to complete establishment of an MS-PW segment.

If the obtained information of the switching provider edge at the bifurcation position matches with the information of the switching provider, it indicates that the switching provider edge receiving the label mapping message is the switching provider edge at the bifurcation position, which is corresponding to the SPE2 in FIG. 1. At least two pseudo wires are established from the switching provider edge according to the information of at least two next hops or the information of at least two outgoing interfaces. Specifically, at least two pseudo wires may be established respectively between the switching provider edge and at least two TPE devices that are corresponding to the information of the at least two next-hops. Optionally, at least two pseudo wires are established between the switching provider edge and a next-hop TPE device respectively through at least two outgoing interfaces.

It may be understood that, the number of established pseudo wires is less than or equal to the number of next hops, or less than or equal to the number of outgoing interfaces. For example, when information of four next hops exists, two, three or four pseudo wires may be established.

During a pseudo wire establishment process, one of the pseudo wires may be set as an active pseudo wire, and another pseudo wire may be set as a standby pseudo wire according to a preset policy. In this way, after the pseudo wires are established, when the switching provider edge at the bifurcation position determines that the active pseudo wire is faulty, a fast protection switchover of the pseudo wires may be directly performed.

The method for establishing a pseudo wire in this embodiment is applicable to pseudo wire establishment in an MS-PW system. and the method includes the following steps. A switching provider edge receives a label mapping message sent by a TPE that is directly connected to a customer edge. The switching provider edge obtains information of a switching provider edge at a bifurcation position and obtains information of at least two next hops of the switching provider edge or information of at least two outgoing interfaces of the switching provider edge through parsing. The switching provider edge establishes at least two pseudo wires from the switching provider edge according to the information of at least two next hops or the information of at least two outgoing interfaces. When the method in this embodiment of the present invention is adopted to establish at least two pseudo wires, the TPE connected to the customer edge only needs to send one label mapping message to establish at least two pseudo wires. Compared with the prior art in which the TPE sends one label mapping message to establish one pseudo wire, with the method for establishing a pseudo wire in this embodiment, multiple pseudo wires from the switching provider edge at the bifurcation position to a destination node are established. In this way, a resource consumed by pseudo wire establishment can be reduced. In addition, the switching provider edge at the bifurcation position establishes at least two pseudo wires and completes establishment of multiple MS-PW segments. Furthermore, an identification of an active/standby MS-PW segment may be implemented. When it is determined that an active pseudo wire is faulty, a fast protection switchover of an MS-PW may be implemented on the switching provider edge. In this way, a fast recovery procedure of a pseudo wire is speeded up, and segment protection of the MS-PW can be provided from the switching provider edge at the bifurcation position, thereby making better use of a network resource.

In a specific embodiment of the present invention, before establishing at least two pseudo wires in step 103, the switching provider edge may further obtain active/standby relationship information of the at least two pseudo wires. The switching provider edge establishes at least two pseudo wires according to the active/standby relationship information. Specifically, the information may be obtained by directly parsing information in Sub-TLV in a received label mapping message. Optionally, the information may be obtained by receiving an active/standby pseudo wire information notification sent by a customer edge and parsing active/standby pseudo wire information in the active/standby pseudo wire information notification. Optionally, the information may also be obtained according to a preset policy, which is not intended to limit the embodiments of the present invention.

Method Embodiment 2

Figure 3:
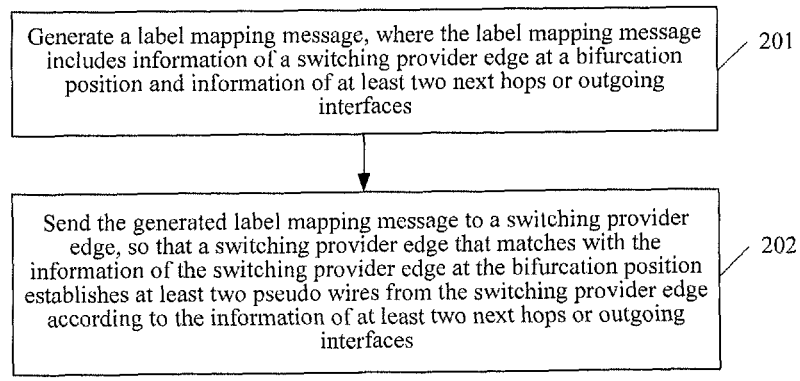
FIG. 3 is a flow chart of a method for establishing a pseudo wire according to a second method embodiment of the present invention.

A method for establishing a pseudo wire is provided, and the method in this embodiment is applicable to an MS-PW system as shown in FIG. 1*a*. A multi-segment pseudo wire MS-PW is to be established between a CE1 and a CE2. An SPE2 is connected to two different TPEs respectively. The method is also applicable to an MS-PW system as shown in FIG. 1*b*. An SPE2 may reach a TPE2 through different outgoing interfaces. A flow chart of the method in this embodiment is shown in FIG. 3, where the method includes:

Step 201: A TPE1 generates a label mapping message, where the label mapping message includes information of a switching provider edge at a bifurcation position. The label mapping message further includes information of two next hops or information of at least two outgoing interfaces of the switching provider edge at the bifurcation position.

It may be understood that, when releasing an explicit route, the TPE configures a source attachment individual identifier (SAID, an attachment group identifier (AGI), TAII information, and information of an explicit path to a TPE that is directly connected to a peer customer edge.

Figure 4:
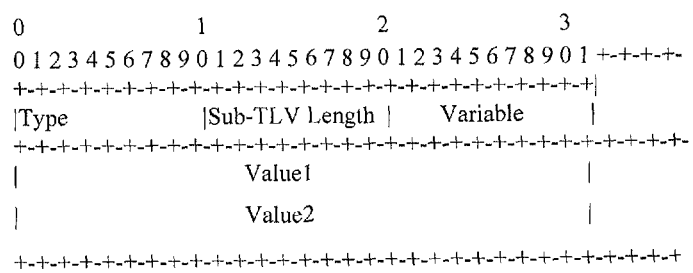
FIG. 4 is a schematic diagram of additional information Sub-TLV according to an embodiment of the present invention.

The switching provider edge at the bifurcation position refers to a switching provider edge that implements redundancy protection of a pseudo wire. When at least two MS-PWs exist between customer edges, the TPE compares devices through which the at least two MS-PWs pass, to obtain the information of the switching provider edge at the bifurcation position. When generating the label mapping message, the TPE adds additional information sub-TLV, to explicit path information TLV in the label mapping message, where the additional information Sub-TLV carries the information of the switching provider edge at the bifurcation position and the information of at least two next hops or the information of at least two outgoing interfaces of the switching provider edge at the bifurcation position. FIG. 4 is a structural diagram of specific Sub-TLV, where Value may be an IPv4 address, and may also be an IPv6 address.

Step 202: The TPE sends the generated label mapping message to a switching provider edge. A switching provider edge receiving the label mapping message and matching with the information of the switching provider edge at the bifurcation position establishes at least two pseudo wires from the switching provider edge according to the information of at least two next hops or the information of at least two outgoing interfaces.

After the switching provider edge receives the generated label mapping message, the method for establishing a pseudo wire is described in the first method embodiment, and is not described here again.

It may be understood that, the TPE may also carry, in the Sub-TLV in the label mapping message, active/standby relationship information of a multi-segment pseudo wire between customer edges. In this way, after receiving the label mapping message, the switching provider edge at the bifurcation position sets at least two pseudo wires according to the active/standby relationship information.

In a specific embodiment, the TPE may also send an active/standby pseudo wire information notification to the switching provider edge to notify an active/standby condition of at least two pseudo wires that are established from the switching provider edge at the bifurcation position. In this way, the switching provider edge that matches with the information of the switching provider edge at the bifurcation position establishes at least two pseudo wires according to the active/standby pseudo wire information notification.

The method for establishing a pseudo wire in this embodiment is applicable to pseudo wire establishment in an MS-PW system. The method includes the following steps. A TPE connected to a customer edge generates a label mapping message. The label mapping message includes information of a switching provider edge at a bifurcation position. The label mapping message further includes information of at least two next hops or information of at least two outgoing interfaces of the switching provider edge. After receiving the label mapping message, the switching provider edge at the bifurcation position establishes at least two pseudo wires from the switching provider edge according to the information of at least two next hops or the information of at least two outgoing interfaces. When the method in this embodiment of the present invention is adopted to establish at least two pseudo wires, the TPE only needs to send one label mapping message to establish at least two pseudo wires. Compared with the prior art in which the TPE sends one label mapping message to establish one pseudo wire, with the method for establishing a pseudo wire in this embodiment, multiple pseudo wires from the switching provider edge at the bifurcation position to a destination node are established. In this way, a resource consumed by pseudo wire establishment can be reduced. In addition, after the switching provider edge at the bifurcation position establishes at least two pseudo wires, one of the pseudo wires is an active pseudo wire. In this way, when the switching provider edge at the bifurcation position determines that the active pseudo wire is faulty, an active/standby pseudo wire switchover may be performed directly. Compared with the prior art in which the TPE needs to send switchover signaling to perform a switchover, a procedure of a pseudo wire protection switchover is simplified. Segment protection may be provided from the switching provider edge at the bifurcation position, thereby making better use of a network resource.

Method Embodiment 3

Figure 5:
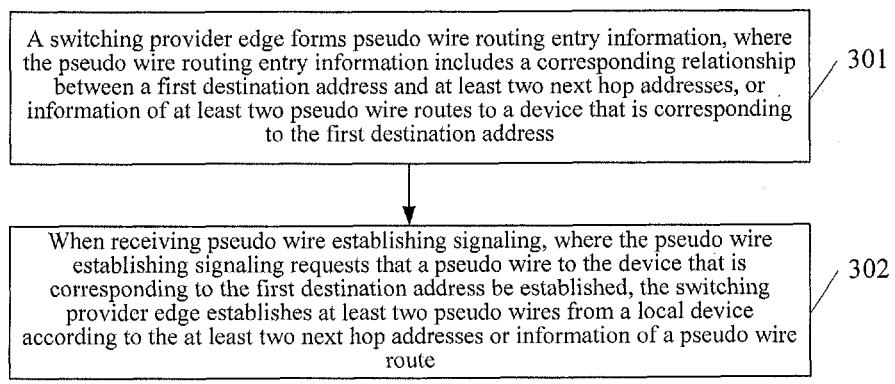
FIG. 5 is a flow chart of a method for establishing a pseudo wire according to a third method embodiment of the present invention.

A method for establishing a pseudo wire is provided. The method in this embodiment is applicable to an MS-PW system as shown in FIG. 1. Within a multi-segment pseudo wire between a CE1 and a CE2, an SPE2 is connected to two different TPEs respectively. The same anycast address is configured on the two different TPEs, namely, a TPE3 and a TPE4. The method is also applicable to an MS-PW system as shown in FIG. 1*b*. An SPE2 may reach a TPE2 through different outgoing interfaces. A flow chart of the method for establishing a pseudo wire in this embodiment is shown in FIG. 5, where the method includes:

Step 301: During a process of extending routing information, pseudo wire routing entry information is formed on the SPE2. The routing entry information includes a correspondence between a first destination address and at least two next hop addresses, namely, a correspondence between an anycast address and at least two next hop addresses. Optionally, the routing entry information includes information of at least two different pseudo wire routes to a device that is corresponding to the first destination address.

It may be understood that, in the case as shown in FIG. 1a, if communication is established between the CE1 and the CE2, PW routing entry information, namely, a correspondence between a destination address and a next hop address, is formed in a route diffusion process. Specifically, release of a PW route is completed through a routing protocol, and PW routing entry information is formed on a device. The TPE3 and the TPE4 are configured with the same anycast address, and the two devices release routing information according to the same address. Routing entry information is formed on a switching provider edge through which the routing information passes.

For the SPE2 at the bifurcation position, a routing entry in which the same destination address corresponds to at least two different next hop addresses is formed.

In the case as shown in FIG. 1b, if communication is established between the CE1 and the CE2, PW routing entry information is formed during a route diffusion process. The routing entry information includes a correspondence between a destination address and device outgoing interfaces. When a TPE1 sends a route extension message, routing information is released by using an address of the TPE1 as a destination address. Routing entry information is formed on a switching provider edge through which the routing information passes. When the TPE2 sends a routing message, routing information is released by using an address of the TPE2 as a destination address. Information of at least two pseudo wire routes from the SPE2 to the TPE2 through at least two outgoing interfaces is released, and routing entry information is formed on a switching provider edge through which the routing information passes.

For the SPE2 at the bifurcation position, a routing entry in which the same destination address corresponds to information of at least two different pseudo wire routes is formed.

Step 302: When receiving pseudo wire establishing signaling, wherein the pseudo wire establishing signaling requests that a pseudo wire to the device that is corresponding to the first destination address be established, the SPE2 establishes at least two pseudo wires from the switching provider edge that receives the pseudo wire establishing signaling, according to the at least two next hop addresses, or the information of at least two different routes to the device that is corresponding to the first destination address.

It may be understood that, prior to pseudo wire establishment, active/standby pseudo wire information of at least two pseudo wires may be obtained. At least two pseudo wires are established according to the active/standby pseudo wire information. The active/standby pseudo wire information may be obtained according to such a method in which a policy is preset by an SPE that receives the pseudo wire establishing signaling.

Figure 6:
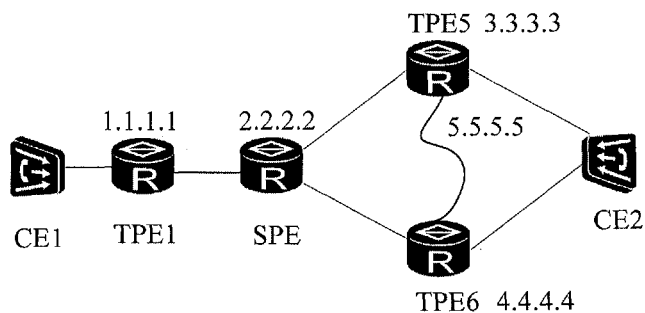
FIG. 6 is a schematic structural diagram of an MS-PW system to which a method for establishing a pseudo wire is applicable according to a method embodiment of the present invention.

A specific embodiment is taken as an example for description. A schematic structural diagram is shown in FIG. 6. An SPE is connected to two TPEs. First, the same anycast address 5.5.5.5 needs to be configured on a TPE5 and a TPE6. A pseudo wire establishment process is specifically implemented through the following method:

1. Preparation Work for Pseudo Wire Establishment, Namely, Release of Routing Information:

Diffusion of routing information: During a routing information diffusion process, pseudo wire routing entry information is formed on a device. A TPE1 sends a route extension message, and releases routing information with 1.1.1.1 as a destination address. A routing entry is formed on the SPE, namely a correspondence indicating that a next-hop node is 1.1.1.1 when a destination node is 1.1.1.1. A route extension message is sent according to a forwarding outgoing interface. When receiving a label mapping message, the TPE5 and the TPE6 respectively form an entry, namely a correspondence indicating that a next-hop node is 2.2.2.2 when a destination address is 1.1.1.1.

The TPE5 and the TPE6 send a route extension message, and release routing information with 5.5.5.5 as a destination node. When the SPE forms, according to a label mapping message, an entry, namely a correspondence indicating that next hops are 3.3.3.3 and 4.4.4.4 respectively when a destination address is 5.5.5.5. The TPE1 forms an entry, namely a correspondence indicating that a next hop is 2.2.2.2 when a destination address is 5.5.5.5.

2. Pseudo Wire Establishment:

One pseudo wire from the TPE1 to the SPE is established. When the pseudo wire is established from the SPE, and when the TPE1 receives pseudo wire establishing signaling, wherein the pseudo wire establishing signaling requests that a pseudo wire to a device that is corresponding to a destination address 5.5.5.5 be established, two pseudo wires are established from the SPE according to two next hop addresses in routing entry information. During establishment, an active/standby condition of the pseudo wires may be set according to preset configuration.

After at least two pseudo wires are established, when the SPE determines that an active pseudo wire is faulty, an active/standby pseudo wire switchover may be performed by directly configuring information receiving and sending at an interface to the TPE5 and configuring information receiving and sending at an interface to the TPE6. The TPE that is connected to a customer edge does not need to send switchover signaling to perform a switchover. In this way, a recovery process of a pseudo wire is simplified.

The method for establishing a pseudo wire in this embodiment is applicable to pseudo wire establishment in an MS-PW system The method includes the following steps. A switching provider edge forms pseudo wire routing entry information. The pseudo wire routing entry information includes a correspondence between a first destination address and at least two next hop addresses. Optionally, the pseudo wire routing entry information includes information of at least two different routes to a device that is corresponding to the first destination address. When receiving pseudo wire establishing signaling, wherein the pseudo wire establishing signaling requests that a pseudo wire to the device that is corresponding to the first destination address be established, the switching provider edge establishes at least two pseudo wires from a local device according to the at least two next hop addresses, or the information of at least two different routes to the device that is corresponding to the first destination address. Compared with the prior art in which a TPE device needs to send switchover signaling of an active/standby pseudo wire to perform a switchover, with the method in this embodiment of the present invention, after at least two multi-hop pseudo wires are established, one of the pseudo wires is an active pseudo wire. In this way, when the switching provider edge determines that the active pseudo wire is faulty, an active/standby pseudo wire switchover is directly performed, so that a recovery process of a pseudo wire is simplified, and a network resource can also be saved.

Device Embodiment 1

Figure 7:
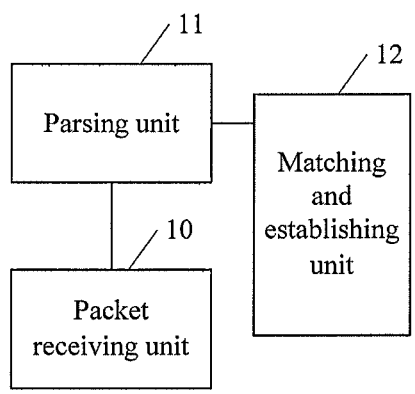
FIG. 7 is a schematic structural diagram of a switching provider edge according to a first device embodiment of the present invention.

A switching provider edge, a schematic structural diagram of which is shown in FIG. 7, includes:

A packet receiving unit 10 is configured to receive a label mapping message. The label mapping message includes information of a switching provider edge at a bifurcation position. The label mapping message further includes information of at least two next hops or information of at least two outgoing interfaces of the switching provider edge at the bifurcation position.

The switching provider edge at the bifurcation position here refers to a switching provider edge that implements redundancy protection of a pseudo wire. The switching provider edge may be connected to two different TPE devices. Optionally the switching provider edge may reach the same next-hop device through different outgoing interfaces. The label mapping message may further include explicit path information that is used for releasing explicit routing information, and active/standby information indicating establishment of at least two pseudo wires, and so on.

A parsing unit 11 is configured to parse the label mapping message received by the packet receiving unit 10 to obtain the information of the switching provider edge at the bifurcation position and to obtain the information of at least two next hops or at least two outgoing interfaces.

It may be understood that, the parsing unit 11 may specifically be a sub-TLV parsing unit, configured to parse explicit path information such as information of additional type Sub-TLV in TLV in the label mapping message, to obtain the information of the switching provider edge at the bifurcation position and to obtain the information of at least two next hops or the information of at least two outgoing interfaces of the switching provider edge.

A matching and establishing unit 12 is configured to compare the information of the switching provider edge at the bifurcation position with information of the switching provider edge receiving the label mapping message. The information of the switching provider edge at the bifurcation position is obtained through parsing by the parsing unit 11 If the information of the switching provider edge at the bifurcation position matches with the information of the switching provider edge receiving the label mapping message, the switching provider edge receiving the label mapping message establishes at least two pseudo wires from the switching provider edge according to the information of at least two next hops or the information of at least two outgoing interfaces.

For example, if the information of the switching provider edge at the bifurcation position matches with the information of the switching provider edge receiving the label mapping message, it indicates that the switching provider edge receiving the label mapping message is the switching provider edge at the bifurcation position. Then, at least two pseudo wires are established from the switching provider edge according to the information of at least two next hops or the information of at least two outgoing interfaces. If the information of the switching provider edge at the bifurcation position does not match with the information of the switching provider edge receiving the label mapping message, it indicates that the switching provider edge receiving the label mapping message is not located at a bifurcation position. Then, the label mapping message is forwarded to a next-hop node device to complete establishment of an MS-PW segment.

During a pseudo wire establishment process, one of the pseudo wires may be set as an active pseudo wire, and another pseudo wire may be set as a standby pseudo wire according to a preset policy. In this way, after the pseudo wires are established, when the switching provider edge at the bifurcation position determines that the active pseudo wire is faulty, a fast protection switchover of a pseudo wire may be completed directly.

Figure 8:
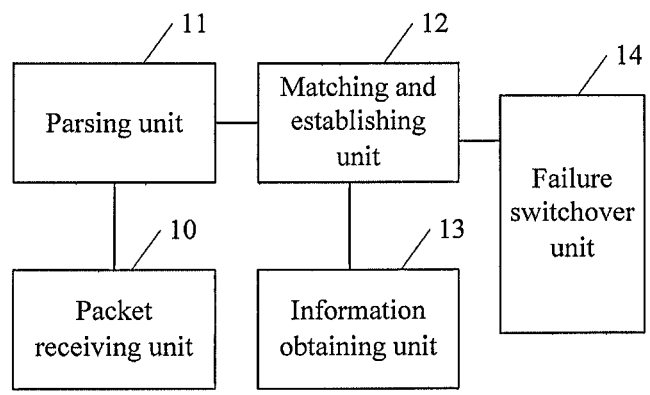
FIG. 8 is a schematic structural diagram of another switching provider edge according to the first device embodiment of the present invention.

Referring to FIG. 8, in a specific embodiment, a switching provider edge may further include an information obtaining unit 13, configured to obtain active/standby relationship information for establishing at least two pseudo wires. The matching and establishing unit 12 is configured to establish the at least two pseudo wire according to the active/standby relationship information obtained by the information obtaining unit 13.

Specifically, the information obtaining unit 13 may be a parsing sub-unit, configured to parse the label mapping message received by the packet receiving unit 10 to obtain active/standby relationship information of at least two pseudo wires. Optionally, the information obtaining unit 13 may be a notification receiving and parsing sub-unit, configured to receive an active/standby pseudo wire information notification sent by a TPE that is connected to a customer edge, and parse the active/standby pseudo wire information notification to obtain the active/standby relationship information of the at least two pseudo wires.

In another specific embodiment, a switching provider edge may further include: a failure switchover unit 14, configured to perform an active/standby pseudo wire switchover when it is determined that an active pseudo wire of the at least two pseudo wires that are established by the matching and establishing unit 12 is faulty.

In the switching provider edge in this embodiment, the packet receiving unit 10 is configured to receive the label mapping message sent by the TPE that is directly connected to the customer edge. The parsing unit 11 is configured to obtain the information of the switching provider edge at the bifurcation position and to obtain the information of at least two next hops or the information of at least two outgoing interfaces of the switching provider edge through parsing. If the information of the switching provider edge at the bifurcation position matches with the information of the switching provider edge receiving the label mapping message, the matching and establishing unit 12 is configured to establish at least two pseudo wires from the switching provider edge according to the information of at least two next hops or the information of at least two outgoing interfaces. When the switching provider edge in this embodiment of the present invention establishes at least two pseudo wires, the TPE only needs to send one label mapping message to establish at least two pseudo wires. Compared with the prior art in which a TPE sends one label mapping message to establish one pseudo wire, the switching provider edge in this embodiment establishes multiple pseudo wires from a local device to a destination node. In this way, a resource consumed by pseudo wire establishment can be reduced. In addition, after the switching provider edge at the bifurcation position establishes two pseudo wires, establishment of multiple MS-PW segments is completed, and an identification of an active/standby MS-PW segment may be implemented. When the failure switchover unit 14 determines that an active pseudo wire is faulty, a fast protection switchover of an MS-PW may be implemented on the switching provider edge. In this way, a fast recovery process of a pseudo wire is speeded up, and segment protection of the MS-PW may be provided from the switching provider edge at the bifurcation position, thereby making better use of a network resource.

Device Embodiment 2

Figure 9:
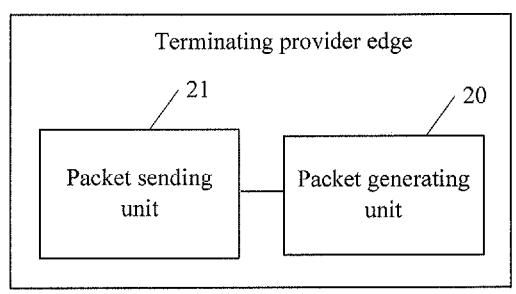
FIG. 9 is a schematic structural diagram of a TPE according to a second device embodiment of the present invention.

A terminating provider edge TPE of a service provider, a schematic structural diagram of which is shown in FIG. 9, includes:

A packet generating unit 20 is configured to generate a label mapping message. The label mapping message includes information of a switching provider edge at a bifurcation position. The label mapping message further includes information of at least two next hops or information of at least two outgoing interfaces of the switching provider edge at the bifurcation position.

When generating the label mapping message, the packet generating unit 20 may add additional information Sub-TLV to explicit path information TLV in the label mapping message, and add the information of the switching provider edge at the bifurcation position and the information of at least two next hops or at least two outgoing interfaces of the switching provider edge to an additional type Sub-TLV.

A packet sending unit 21 is configured to send the label mapping message generated by the packet generating unit 20 to a switching provider edge, so that a switching provider edge that matches with the information of the switching provider edge at the bifurcation position establishes at least two pseudo wires from the switching provider edge according to the information of two next hops or at least two outgoing interfaces.

Figure 10:
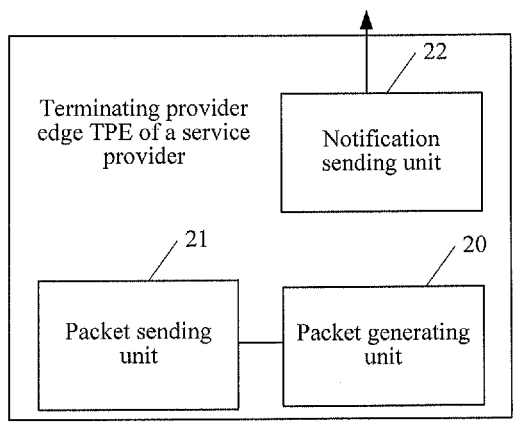
FIG. 10 is a schematic structural diagram of another TPE according to the second device embodiment of the present invention.

Referring to FIG. 10, in a specific embodiment, a TPE may further include: a notification sending unit 22, configured to send an active/standby pseudo wire information notification to a switching provider edge, so that a switching provider edge that matches with information of a switching provider edge at a bifurcation position establishes at least two pseudo wires according to the active/standby pseudo wire information notification.

In the terminating provider edge TPE of the service provider in this embodiment, the packet generating unit 20 generates the label mapping message. The label mapping message includes the information of the switching provider edge at the bifurcation position. The label mapping message further includes the information of at least two next hops or the information of at least two outgoing interfaces of the switching provider edge. The packet sending unit 21 sends the label mapping message. After receiving the label mapping message, the switching provider edge at the bifurcation position establishes at least two pseudo wires from the switching provider edge according to the information of at least two next hops or the information of at least two outgoing interfaces. Compared with the prior art in which a TPE sends one label mapping message to establish one pseudo wire, in this embodiment, the TPE only needs to send one label mapping message to establish at least two pseudo wires, thereby reducing a resource consumed by pseudo wire establishment. In addition, after the switching provider edge at the bifurcation position establishes at least two pseudo wires, one of the pseudo wires is an active pseudo wire. In this way, when the active pseudo wire is faulty, an active/standby pseudo wire switchover may be performed directly. Compared with the prior art in which the TPE needs to send switchover signaling to perform a switchover, a process of a pseudo wire protection switchover is simplified, and segment protection may be provided from the switching provider edge at the bifurcation position, thereby making better use of a network resource.

Device Embodiment 3

Figure 11:
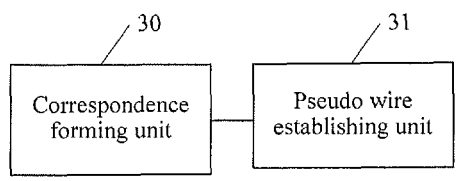
FIG. 11 is a schematic structural diagram of a switching provider edge according to a third device embodiment of the present invention.

A switching provider edge, a schematic structural diagram of which is shown in FIG. 11, includes:

A correspondence forming unit 30 is configured to form pseudo wire routing entry information. The pseudo wire routing entry information includes a correspondence between a first destination address and at least two next hop addresses, or information of at least two different routes to a device that is corresponding to the first destination address.

It may be understood that, the correspondence forming unit 30 forms the pseudo wire routing entry information after receiving a route extension message and during a route information diffusion process of a TPE device.

A pseudo wire establishing unit 31 is configured to, when receiving pseudo wire establishing signaling, wherein the pseudo wire establishing signaling requests that a pseudo wire to the device that is corresponding to the first destination address be established, establish at least two pseudo wires from the switching provider edge according to the at least two next hop addresses that are corresponding to the first destination address, or the information of at least two different routes to the device that is corresponding to the first destination address. The routing entry information is formed by the correspondence forming unit 30.

Figure 12:
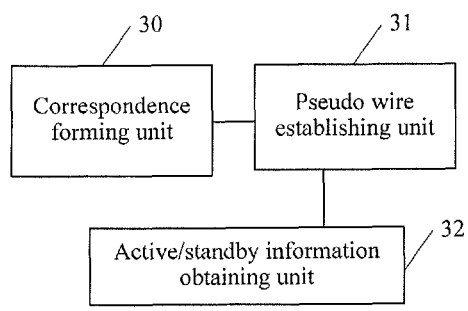
FIG. 12 is a schematic structural diagram of another switching provider edge according to the third device embodiment of the present invention.

Referring to FIG. 12, in a specific embodiment, a device in this embodiment may further include an active/standby information obtaining unit 32, configured to obtain active/standby pseudo wire information of at least two pseudo wires. The pseudo wire establishing unit 31 is configured to establish at least two pseudo wires from a local device according to the active/standby pseudo wire information obtained by the active/standby information obtaining unit 32.

In the switching provider edge in this embodiment, the correspondence forming unit 30 forms the pseudo wire routing entry information. The pseudo wire routing entry information includes the correspondence between the first destination address and the at least two next hop addresses, or the information of at least two different routes to the device that is corresponding to the first destination address. When receiving the pseudo wire establishing signaling, where the pseudo wire establishing signaling requests that a pseudo wire to the device that is corresponding to the first destination address be established, the pseudo wire establishing unit 31 establishes at least two pseudo wires from the switching provider edge according to the at least two next hop addresses, or the information of at least two different routes to the device that is corresponding to the first destination address. Compared with the prior art in which a TPE device sends active/standby pseudo wire switchover signaling to perform a switchover, with the method in this embodiment of the present invention, after at least two multi-hop pseudo wires are established, one of the pseudo wires is an active pseudo wire. In this way, when the switching provider edge determines that the active pseudo wire is faulty, an active/standby pseudo wire switchover is directly performed, so that a recovery process of a pseudo wire is simplified, and a network resource can also be saved.

System Embodiment

Figure 13:
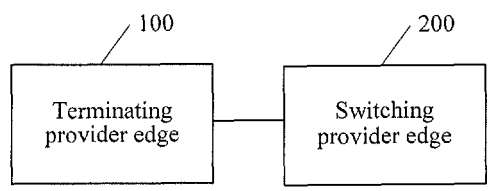
FIG. 13 is a schematic structural diagram of a system for establishing a pseudo wire according to a system embodiment of the present invention.

A system for establishing a pseudo wire, a schematic structural diagram of which is shown in FIG. 13, includes a switching provider edge 200 and a terminating provider edge 100. The TPE 100 is configured to generate a label mapping message. The label mapping message includes information of a switching provider edge at a bifurcation position. The label mapping message further includes information of at least two next hops or information of at least two outgoing interfaces of the switching provider edge at the bifurcation position. The TPE 100 is further configured to send the generated label mapping message to the switching provider edge 200. The switching provider edge 200 is configured to receive the label mapping message, parse the label mapping message to obtain the information of the switching provider edge at the bifurcation position and to obtain the information of at least two next hops or the information of at least two outgoing interfaces of the switching provider edge at the bifurcation position, compare the information of the switching provider edge at the bifurcation position with information of the switching provider edge 200, and if the information of the switching provider edge at the bifurcation position matches with information of the switching provider edge 200, establish at least two pseudo wires from the switching provider edge according to the information of at least two next hops or the information of at least two outgoing interfaces.

Persons of ordinary skill in the art may understand that all or a part of steps of various methods in the foregoing embodiments may be implemented by a program instructing relevant hardware. The program may be stored in a computer readable storage medium, and the storage medium may include a Read Only Memory (ROM), a Random Access Memory (RAM), a magnetic disk, or an optical disk, and so on.

A method, a system, and a device for establishing a pseudo wire that are provided in the embodiments of the present invention are introduced in detail in the foregoing. In this specification, Specific examples are used for illustrating principles and implementation manners of the present invention. The foregoing descriptions of the embodiments are merely used to help understand the embodiments of the present invention. Meanwhile, persons of ordinary skill in the art may make modifications to the specific implementation manners and application scopes according to the idea of the present invention. In conclusion, the content of the specification shall not be construed as a limitation to the present invention.

What is claimed is:

1. A method for establishing a pseudo wire, comprising:
    receiving, by a switching provider edge, a label mapping message from a terminating provider edge (TPE) connected to a customer edge, wherein the label mapping message comprises information of a switching provider edge at a bifurcation position, the label mapping message further comprises information of at least two next hops of the switching provider edge at the bifurcation position, wherein the switching provider edge at the bifurcation position implements redundancy protection of a pseudo wire;
    parsing, by the switching provider edge that receives the label mapping message, the label mapping message to obtain the information of the switching provider edge at the bifurcation position, and to obtain the information of the at least two next hops; and
    comparing, by the switching provider edge that receives the label mapping message, information of the switching provider edge that receives the label mapping message with the information of the switching provider edge at the bifurcation position, and if the information of the switching provider edge that receives the label mapping message matches with the information of the switching provider edge at the bifurcation position, establishing at least two pseudo wires between the switching provider edge that receives the label mapping message and at least two provider edges that correspond to the information of the at least two next hops, wherein one of the at least two pseudo-wires is set as an active pseudo-wire and at least another pseudo wire of the at least two second pseudo wires is set as a standby pseudo-wire of the active pseudo-wire.

2. The method according to claim 1,
    wherein before the establishing at least two pseudo wires between the switching provider edge that receives the label mapping message and at least two provider edges that correspond to the information of the at least two next hops, the method further comprises obtaining active/standby relationship information of the at least two pseudo wires, and
    wherein the at least two pseudo wires are established according to the active/standby relationship information.

3. The method according to claim 2, wherein the obtaining the active/standby relationship information of the at least two pseudo wires comprises:
    parsing the label mapping message to obtain the active/standby relationship information of the at least two pseudo wires;
    or
    receiving an active/standby pseudo wire information notification sent by the TPE, and parsing the active/standby pseudo wire information notification to obtain the active/standby relationship information of the at least two pseudo wires.

4. A system for establishing a pseudo wire, comprising a first routing apparatus and a second routing apparatus, wherein
    the first routing apparatus is configured to generate a label mapping message, wherein the label mapping message comprises information of a switching provider edge at a bifurcation position, the label mapping message further comprises information of at least two next hops of the switching provider edge at the bifurcation position, and send the generated label mapping message to the second routing apparatus; and
    the second routing apparatus is configured to receive the label mapping message, parse the label mapping message to obtain the information of the switching provider edge at the bifurcation position, and to obtain the information of the at least two next hops of the switching provider edge at the bifurcation position, compare the information of the switching provider edge at the bifurcation position with information of the second routing apparatus, and if the information of the switching provider edge at the bifurcation position matches with the information of the second routing apparatus, establish at least two pseudo wires between the second routing apparatus and at least two routing apparatuses that correspond to the information of the at least two next hops, wherein one of the at least two pseudo-wires is set as an active pseudo-wire and at least another pseudo wire of the at least two second pseudo wires is set as a standby pseudo-wire of the active pseudo-wire.

5. The system according to claim 4, wherein the first routing apparatus comprises:
    a packet generating unit, configured to generate the label mapping message; and
    a packet sending unit, configured to send the label mapping message generated by the packet generating unit to the second routing apparatus.

6. A routing apparatus acting as a first routing apparatus, comprising:
- a non-volatile memory, configured to store instructions; and
- a processor, configured to execute the instructions, wherein the instructions comprise:
- instructions for receiving a label mapping message from a second routing apparatus connected to a customer edge, wherein the label mapping message comprises information of a switching provider edge at a bifurcation position, the label mapping message further comprises information of at least two next hops of the switching provider edge at the bifurcation position, wherein the switching provider edge at the bifurcation position implements redundancy protection of a pseudo wire;
- instructions for parsing the label mapping message to obtain the information of the switching provider edge at the bifurcation position, and to obtain the information of the at least two next hops; and
- instructions for comparing information of the first routing apparatus with the information of the switching provider edge at the bifurcation position, and if the information of the first routing apparatus matches with the information of the switching provider edge at the bifurcation position, establishing at least two pseudo wires between the first routing apparatus and at least two provider edges that corresponds to the information of the at least two next hops, wherein one of the at least two pseudo-wires is set as an active pseudo-wire and at least another pseudo wire of the at least two second pseudo wires is set as a standby pseudo-wire of the active pseudo-wire.

7. The routing apparatus according to claim 6, wherein the instructions stored in the memory further comprise instructions for obtaining active/standby relationship information of the at least two pseudo wires; and
- wherein the at least two pseudo wires are established according to the active/standby relationship information.

8. A routing apparatus acting as a first routing apparatus, comprising:
- a non-volatile memory, configured to store instructions; and a processor, configured to execute the instructions, wherein the instructions comprise:
- instructions for generating a label mapping message, wherein the label mapping message comprises information of a switching provider edge at a bifurcation position, and information of at least two next hops of the switching provider edge at the bifurcation position, wherein the switching provider edge at the bifurcation position implements redundancy protection of a pseudo wire by establishing at least two pseudo wires that correspond to the information of the at least two next hops, wherein one of the at least two pseudo-wires is set as an active pseudo-wire and at least another pseudo wire of the at least two second pseudo wires is set as a standby pseudo-wire of the active pseudo-wire; and
- instructions for sending the label mapping message to a second routing apparatus.

9. The routing apparatus according to claim 8, wherein the instructions stored in the memory further comprise instructions for sending an active/standby pseudo wire information notification to the second routing apparatus.

* * * * *